United States Patent
Kawahara et al.

(10) Patent No.: US 10,452,352 B2
(45) Date of Patent: Oct. 22, 2019

(54) VOICE INTERACTION APPARATUS, ITS PROCESSING METHOD, AND PROGRAM

(71) Applicants: TOYOTA JIDOSHA KABUSHIKI KAISHA, Toyota-shi (JP); Kyoto University, Kyoto-shi (JP)

(72) Inventors: Tatsuya Kawahara, Kyoto (JP); Katsuya Takanashi, Kyoto (JP); Ryosuke Nakanishi, Kyoto (JP); Narimasa Watanabe, Nagakute (JP)

(73) Assignees: TOYOTA JIDOSHA KABUSHIKI KAISHA, Toyota-shi (JP); Kyoto University, Kyoto-shi (JP)

( * ) Notice: Subject to any disclaimer, the term of this patent is extended or adjusted under 35 U.S.C. 154(b) by 0 days.

(21) Appl. No.: 15/883,240

(22) Filed: Jan. 30, 2018

(65) Prior Publication Data
US 2018/0253280 A1 Sep. 6, 2018

(30) Foreign Application Priority Data
Mar. 3, 2017 (JP) ................................. 2017-040580

(51) Int. Cl.
*G06F 17/27* (2006.01)
*G10L 15/22* (2006.01)
(Continued)

(52) U.S. Cl.
CPC .......... *G06F 3/167* (2013.01); *G06F 17/2755* (2013.01); *G06F 17/2785* (2013.01);
(Continued)

(58) Field of Classification Search
CPC ..... G10L 15/22; G10L 15/26; G06F 17/2785; G06F 17/2755; G06F 17/277
See application file for complete search history.

(56) References Cited

U.S. PATENT DOCUMENTS

| 2001/0012335 A1* | 8/2001 | Kaufman | H04M 3/4285 379/67.1 |
| 2002/0007275 A1* | 1/2002 | Goto | G10L 15/1822 704/251 |

(Continued)

FOREIGN PATENT DOCUMENTS

| JP | 2010-262147 A | 11/2010 |
| JP | 2014-48443 A | 3/2014 |

(Continued)

*Primary Examiner* — Samuel G Neway
(74) *Attorney, Agent, or Firm* — Oblon, McClelland, Maier & Neustadt, L.L.P.

(57) ABSTRACT

A voice interaction apparatus incudes voice recognition means for recognizing a voice of a user, response-sentence generation means for generating a response sentence to the voice of the user based on the recognized voice, filler generation means for generating a filler word to be inserted in a conversation, output means for outputting the generated response sentence and the generated filler word, and classification means for classifying the generated response sentence into one of predetermined speech patterns indicating predefined speech types. When the output means outputs, after the user utters a voice subsequent to the first response sentence, the filler word and outputs a second response sentence, the classification means classifies the first response sentence into one of the speech patterns, and the filler generation means generates the filler word based on the speech pattern into which the first response sentence has been classified.

6 Claims, 5 Drawing Sheets

(51) Int. Cl.
*G10L 15/26* (2006.01)
*G06F 3/16* (2006.01)
*G10L 15/08* (2006.01)
*G10L 17/00* (2013.01)
*G10L 15/02* (2006.01)
*G10L 13/08* (2013.01)

(52) U.S. Cl.
CPC .............. *G10L 13/08* (2013.01); *G10L 15/02* (2013.01); *G10L 15/08* (2013.01); *G10L 15/22* (2013.01); *G10L 17/005* (2013.01); *G06F 17/277* (2013.01); *G10L 15/26* (2013.01)

(56) References Cited

U.S. PATENT DOCUMENTS

| | | | | |
|---|---|---|---|---|
| 2008/0167874 | A1* | 7/2008 | Eide | ........................ G10L 15/22 |
| | | | | 704/257 |
| 2014/0074483 | A1* | 3/2014 | van Os | .................. G10L 15/22 |
| | | | | 704/275 |
| 2015/0206531 | A1* | 7/2015 | Fujisawa | ................. G10L 15/22 |
| | | | | 704/251 |
| 2015/0206532 | A1* | 7/2015 | Fujisawa | ................. G10L 15/22 |
| | | | | 704/251 |
| 2018/0068660 | A1* | 3/2018 | Kawahara | ............... G10L 15/26 |
| 2018/0218731 | A1* | 8/2018 | Gustafson | ............... G10L 25/48 |
| 2018/0227417 | A1* | 8/2018 | Segalis | .................. G06N 20/00 |
| 2018/0253280 | A1* | 9/2018 | Kawahara | ........... G06F 17/2755 |

FOREIGN PATENT DOCUMENTS

| | | |
|---|---|---|
| JP | 2014-191030 | 10/2014 |
| JP | 2016-126293 | 7/2016 |

* cited by examiner

| SPEECH PATTERN | CONTENT |
|---|---|
| (1) Yes/no INQUIRY | INQUIRY FOR INQUIRING ABOUT TRUTH |
| (2) Wh INQUIRY | INQUIRY FOR SELECTING FROM GROUP |
| (3) ANSWER | ANSWER, AGREEMENT, ACCEPTANCE, ETC. |
| (4) DISCLOSURE | SELF-DISCLOSURE, REQUEST, ETC. |
| (5) OTHERS | GREETING, INTRODUCTION, ETC. |

Fig. 3

| TIME | APPARATUS SPEECH | USER SPEECH | SPEECH PATTERN |
|---|---|---|---|
| T-3 | HELLO. | | (5) OTHERS |
| T-2 | | HELLO. | (5) OTHERS |
| T-1 | I LIKE COOKING, | | (4) DISCLOSURE |
| T | DO YOU HAVE ANY HOBBY? | | (2) Wh INQUIRY |
| T+1 | | I PLAY GO. | (3) ANSWER |
| T+2 | OH, | | (FILLER) |
| T+3 | THAT SOUNDS GOOD. | | (3) ANSWER |

Fig. 4

| APPARATUS SPEECH | SUBSEQUENT USER SPEECH |
|---|---|
| (1) Yes/no INQUIRY | (3) ANSWER |
| (2) Wh INQUIRY | (3) ANSWER |
| (3) ANSWER | (4) DISCLOSURE |
| (4) DISCLOSURE | (3) ANSWER |
| (5) OTHERS | (1) Yes/no INQUIRY / (2) Wh INQUIRY |

Fig. 5

| SPEECH PATTERN | TYPE OF FEATURE VALUE |
|---|---|
| (1) Yes/no INQUIRY | PROSODIC INFORMATION OF PRECEDING SPEECH |
| (2) Wh INQUIRY | PROSODIC INFORMATION OF PRECEDING SPEECH<br>LINGUISTIC INFORMATION OF PRECEDING SPEECH |
| (3) ANSWER | LINGUISTIC INFORMATION OF SUBSEQUENT SPEECH |
| (4) DISCLOSURE | PROSODIC INFORMATION OF PRECEDING SPEECH |
| (5) OTHERS | PROSODIC INFORMATION OF PRECEDING SPEECH<br>LINGUISTIC INFORMATION OF PRECEDING SPEECH |

Fig. 6

| FILLER TYPE | FILLER WORD |
|---|---|
| INHERENT TYPE | LET'S SEE, WELL |
| RESPONSIVE-WORD TYPE | YAH |
| INSTRUCTION-WORD TYPE | I MEAN, WELL, |
| ADVERBIAL TYPE | GEE, OH |
| AWARENESS TYPE | AH, UH |
| OTHERS | HOW SHOULD I SAY |
| NONE | |

Fig. 7

VOICE INTERACTION APPARATUS, ITS PROCESSING METHOD, AND PROGRAM

CROSS REFERENCE TO RELATED APPLICATIONS

This application is based upon and claims the benefit of priority from Japanese patent application No. 2017-040580, filed on Mar. 3, 2017, the disclosure of which is incorporated herein in its entirety by reference.

BACKGROUND

The present disclosure relates to a voice interaction apparatus that performs a voice interaction with a user, and its processing method and a program therefor.

A voice interaction apparatus that inserts filler words (i.e., words for filling silences in conversations) to prevent silences in conversations from being unnaturally prolonged has been known (see Japanese Unexamined Patent Application Publication No. 2014-191030).

However, the present inventors have found the following problem. That is, the aforementioned voice interaction apparatus outputs a formal (i.e., perfunctory) filler word as a word for filling a silence when a waiting time occurs in a conversation. Therefore, there is a possibility that the inserted filler word may not fit well with the content (e.g., meaning) of the conversation and hence make the conversation unnatural.

SUMMARY

The present disclosure has been made to solve the above-described problem and an object thereof is to provide a voice interaction apparatus, its processing method, and a program capable of performing a more natural conversation.

To achieve the above-described object, a first exemplary aspect is a voice interaction apparatus including: voice recognition means for recognizing a voice of a user; response-sentence generation means for generating a response sentence to the voice of the user based on the voice recognized by the voice recognition means; filler generation means for generating a filler word to be inserted in a conversation with the user; and output means for outputting the response sentence generated by the response-sentence generation means and the filler word generated by the filler generation means, in which the voice interaction apparatus further includes classification means for classifying the response sentence generated by the response-sentence generation means into one of predetermined speech patterns indicating predefined speech types, and when the output means outputs, after the user utters a voice subsequent to the first response sentence, the filler word and outputs a second response sentence, the classification means classifies the first response sentence into one of the speech patterns, and the filler generation means generates the filler word based on the speech pattern into which the first response sentence has been classified by the classification means.

According to this aspect, by generating a filler word according to the speech pattern corresponding to the first response sentence, it is possible to generate an optimal filler word suitable for a content (e.g., a meaning) of user's voice subsequent to the first response sentence. By outputting this optimal filler word, it is possible to perform a more natural conversation.

In this aspect, the voice interaction apparatus may further include: storage means for storing table information including the speech patterns and information about types of feature values associated with the speech patterns; and feature-value calculation means for calculating a feature value of a preceding or subsequent speech based on information about the type of the feature value associated with the speech pattern into which the first response sentence has been classified by the classification means, in which the filler generation means may generate the filler word based on the feature value calculated by the feature-value calculation means.

In this way, it is possible to classify the first response sentence into one of the predetermined speech patterns, calculate a feature value of an optimal preceding or subsequent speech corresponding to the speech pattern into which the first response sentence has been classified, and generate an optimal filler word for the conversation by using the calculated feature value.

In this aspect, the information about the type of the feature value may include at least one of prosodic information of the preceding speech, linguistic information of the preceding speech, linguistic information of the subsequent speech, and prosodic information of the subsequent speech.

In this way, it is possible to achieve both a reduction in a processing load and generation of an appropriate filler word and thereby improve a rhythm and a naturalness of the conversation.

In this aspect, the storage means may store filler form information associated with respective feature values of filler types each of which includes at least one filler word and indicates a type of the filler word, and the filler generation means may narrow down the number of filler types based on the speech pattern into which the first response sentence has been classified by the classification means, select one filler type associated with the feature value calculated by the feature-value calculation means from among the narrowed-down filler types, and generate the filler word by selecting the filler word included in the selected filler type.

By narrowing down the number of filler types in advance as described above, it is possible to reduce the processing load even further.

To achieve the above-described object, another exemplary aspect may be a processing method for a voice interaction apparatus, the voice interaction apparatus including: voice recognition means for recognizing a voice of a user; response-sentence generation means for generating a response sentence to the voice of the user based on the voice recognized by the voice recognition means; filler generation means for generating a filler word to be inserted in a conversation with the user; and output means for outputting the response sentence generated by the response-sentence generation means and the filler word generated by the filler generation means, the processing method including: when the output means outputs, after the user utters a voice subsequent to the first response sentence, the filler word and outputs a second response sentence, classifying the first response sentence into one of predetermined speech patterns indicating predefined speech types, and generating the filler word based on the speech pattern into which the first response sentence has been classified.

To achieve the above-described object, another exemplary aspect may be a program for a voice interaction apparatus, the voice interaction apparatus including: voice recognition means for recognizing a voice of a user; response-sentence generation means for generating a response sentence to the voice of the user based on the voice recognized by the voice recognition means; filler generation means for generating a filler word to be inserted in a conversation with the user; and output means for outputting the response sentence generated by the response-sentence generation means and the filler word generated by the filler generation means, the program being adapted to cause a computer to perform: when the output means outputs, after the user utters a voice subsequent to the first response sentence, the filler word and outputs a second response sentence, classifying the first response sentence into one of predetermined speech patterns indicating predefined speech types, and generating the filler word based on the speech pattern into which the first response sentence has been classified.

According to the present disclosure, it is possible to provide a voice interaction apparatus, its processing method, and a program capable of performing a more natural conversation.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure are explained hereinafter with reference to the drawings.

Figure 1:
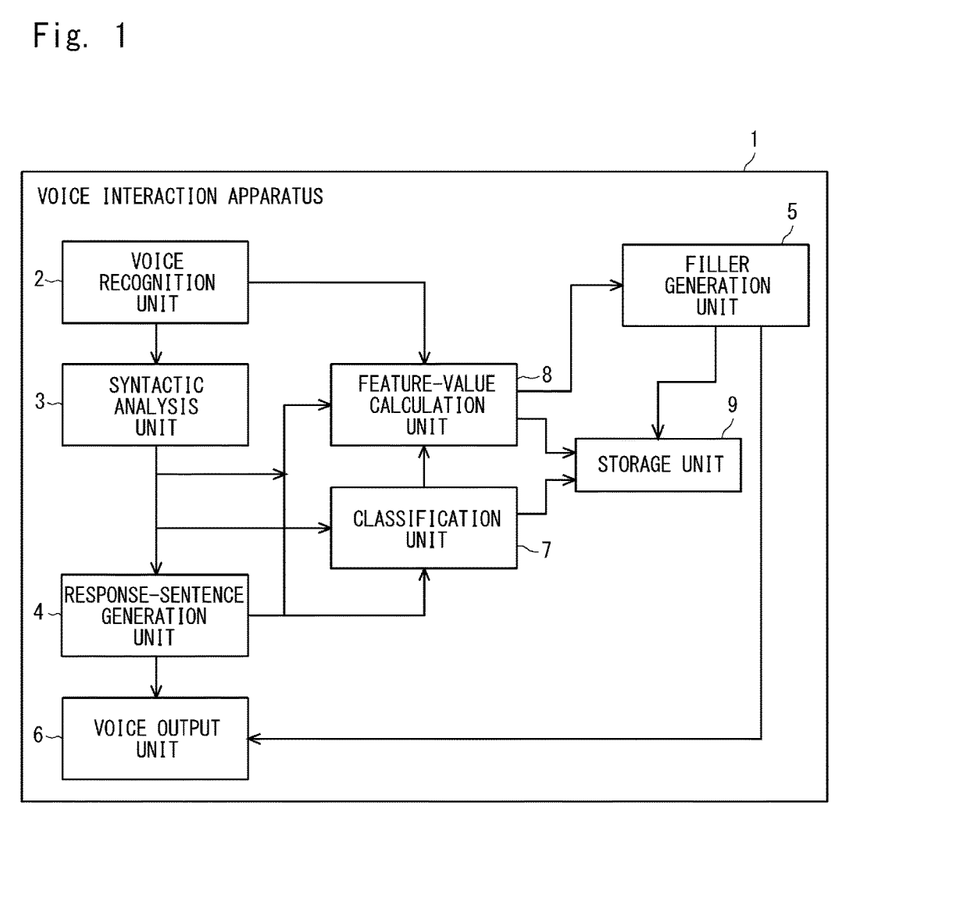
FIG. 1 is a block diagram showing a schematic system configuration of a voice interaction apparatus according to an embodiment of the present disclosure.

FIG. 1 is a block diagram showing a schematic system configuration of a voice interaction apparatus according to an embodiment of the present disclosure. The voice interaction apparatus 1 according to this embodiment is, for example, installed in a robot, a PC (Personal Computer), or a mobile terminal (such as a smartphone or a tablet computer) and performs a conversation with a user.

The voice interaction apparatus 1 includes, for example, a voice recognition unit 2 that recognizes a voice of a user, a syntactic analysis unit 3 that analyzes a sentence structure of the voice, a response-sentence generation unit 4 that generates a response sentence to the voice of the user, a filler generation unit 5 that generates a filler word, a voice output unit 6 that outputs a voice, a classification unit 7 that classifies a speech, a feature-value calculation unit 8 that calculates a feature value, and a storage unit 9 that stores data.

Note that the voice interaction apparatus 1 is formed by, for example, hardware mainly using a microcomputer including a CPU (Central Processing Unit) that performs arithmetic processing and so on, a memory that is composed of a ROM (Read Only Memory) and a RAM (Random Access Memory), and stores an arithmetic program executed by the CPU and the like, an interface unit (I/F) that externally receives and outputs signals, and so on. The CPU, the memory, and the interface unit are connected with each other through a data bus or the like.

The voice recognition unit 2 is a specific example of the voice recognition means. The voice recognition unit 2 performs, for example, a voice recognition process based on information on a user's voice input through a microphone, converts the information of the user's voice into text, and thereby recognizes it as character-string information.

For example, the voice recognition unit 2 converts information of the user's voice input through a microphone into a digital signal. The voice recognition unit 2 performs voice recognition by detecting a speech section from the above-described digitized information and performing pattern matching for voice information in the detected speech section by referring to a statistical linguistic model or the like.

Note that the statistical linguistic model is, for example, a probability model used to calculate an occurrence probability of a linguistic expression, such as an occurrence distribution of a word and a distribution of a word that occurs after a certain word, and is obtained by learning connection probabilities on a morpheme basis. The statistical linguistic model is stored in advance in the storage unit 9 or the like. The voice recognition unit 2 generates part-information-added morpheme information for each morpheme in the user's voice information, i.e., information obtained by adding a type of a part (such as a noun, an adjective, a verb, an adjective, etc.) to each morpheme. The voice recognition unit 2 outputs the recognized user's voice information to the syntactic analysis unit 3.

The storage unit 9 is a specific example of the storage means. The storage unit 9 is composed of, for example, a memory or the like.

The syntactic analysis unit 3 analyzes a sentence structure of the voice information recognized by the voice recognition unit 2. For example, the syntactic analysis unit 3 performs a morpheme analysis or the like for character-string information representing the vocally-recognized user's voice information by using an ordinary morpheme analyzer and performs a semantic analysis for the character-string information. The syntactic analysis unit 3 outputs a result of the analysis of the character-string information (including morpheme information, modification information, text obtained by the recognition, etc.) to the response-sentence generation unit 4.

The response-sentence generation unit 4 is a specific example of the response-sentence generation means. The response-sentence generation unit 4 generates a response sentence to the user's voice information based on the sentence structure of the voice information analyzed by the syntactic analysis unit 3.

For example, the response-sentence generation unit 4 generates a response sentence to the user's voice information based on a result of the analysis of the character-string information output from the syntactic analysis unit 3. More specifically, the response-sentence generation unit 4 extracts one predicate term "play go" from character-string information "I play go". The syntactic analysis unit 3 analyzes the character-string information by using the extracted morpheme string "play go" as a feature vector and using an SVM (Support Vector Machine) model and determines which of two predefined categories the character-string information belongs to.

When it is determined that the character-string information belongs to one of the two predefined categories as a result of the analysis of the character-string information, the response-sentence generation unit 4 generates a response sentence "That sounds good". On the other hand, when it is determined that the character-string information belongs to the other of the two predefined categories as a result of the analysis of the character-string information, the response-sentence generation unit 4 generates a response sentence "It seems to be troublesome". Note that the above-described method for generating a response sentence is merely an example and the method is not limited to the above-described example. That is, an arbitrary method for generating a response sentence, such as a method in which the number of predefined categories is increased, can be used. Further, the predefined categories may be categories for feelings such as "positive" and "negative" and the response-sentence generation unit 4 may make a determination in regard to feelings. The response-sentence generation unit 4 outputs the generated response sentence to the voice output unit 6.

The filler generation unit 5 is a specific example of the filler generation means. The filler generation unit 5 generates a filler word that is inserted in a conversation between a user and the voice interaction apparatus 1. The filler word is a word for filling a silence in a conversation, such as "I mean", "Let's see", and "Yah". The filler generation unit 5 outputs the generated filler word to the voice output unit 6.

The voice output unit 6 is a specific example of the output means. The voice output unit 6 outputs the response sentence generated by the response-sentence generation unit 4 and the filler word generated by the filler generation unit 5 as voices. For example, the voice output unit 6 outputs voices corresponding to the response sentence and the filler word to a user by using a speaker or the like.

For example, the voice output unit 6 synthesizes a voice corresponding to the filler word generated by the filler generation unit 5 and the response sentence generated by the response-sentence generation unit 4 based on the filler word and the response sentence, and outputs the synthesized voice. The voice output unit 6 may output the voice corresponding to the filler word and the response sentence by selecting one of voice files that are set (i.e., stored) in advance in the storage unit 9 or the like.

Incidentally, voice interaction apparatuses in related art output formal (i.e., perfunctory) filler words as words for filling silences when a waiting time occurs in a conversation. Therefore, there is a possibility that these filler words may not fit well with the content (e.g., meaning) of the conversation and hence make the conversation unnatural.

In contrast to this, the voice interaction apparatus 1 according to this embodiment includes the classification unit 7 that classifies a response sentence generated by the response-sentence generation unit 4 into one of predetermined speech patterns indicating predefined speech types. The voice output unit 6 outputs, after a user utters a voice subsequent to a first response sentence, a filler word and outputs a second response sentence. In this case, the classification unit 7 classifies the first response sentence into one of the speech patterns. The filler generation unit 5 generates a filler word based on the speech pattern into which the first response sentence has been classified by the classification unit 7.

The contents (e.g., meanings) of the subsequent user's voice and the second response sentence change according to the content (e.g., meaning) of the first response sentence. Therefore, by generating a filler word based on the speech pattern corresponding to the first response sentence, it is possible to generate an optimal filler word suitable for the content (e.g., meaning) of the user's voice and the second response sentence. By outputting this optimal filler word, it is possible to perform a more natural conversation. For example, in the case of small talk, unlike a conversation in which formal (i.e., perfunctory) filler words are inserted, it is possible to fill silences in a conversation in a natural manner, just like in a conversation with a real person, by outputting optimal filler words.

The classification unit 7 is a specific example of the classification means. The classification unit 7 classifies a response sentence output by the voice output unit 6 (hereinafter called an apparatus speech) and a voice uttered by a user (hereinafter called a user speech) into one of a plurality of speech patterns. The speech patterns indicate predefined speech types.

For example, speech patterns are classified into a plurality of speech patterns according to conversation behaviors of users or by the voice interaction apparatus 1 and the classified speech patterns are set (i.e., stored) in the storage unit 9 or the like. The conversation behaviors indicate relations between user speeches and apparatus speeches.

Figure 2:
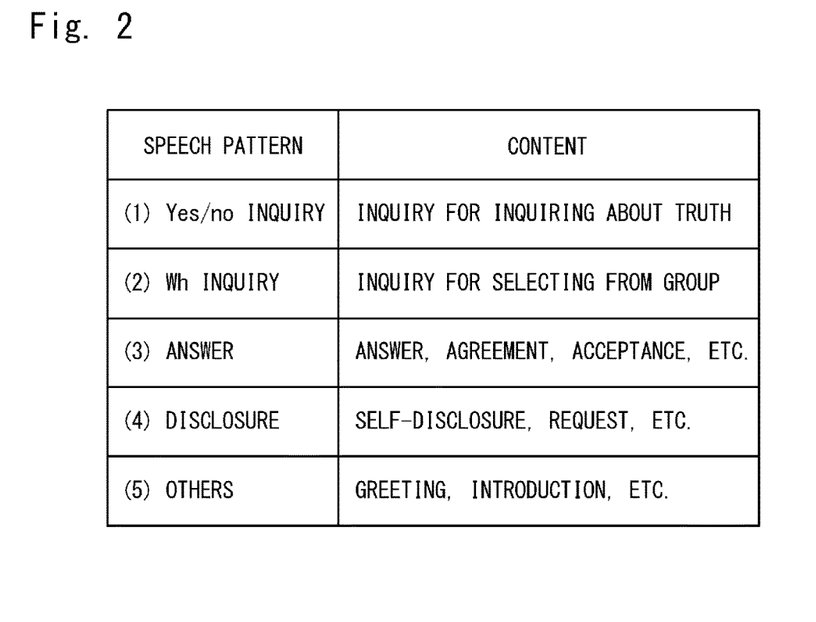
FIG. 2 shows an example of speech patterns.

For example, as shown in FIG. 2, speech patterns are classified into (1) an inquiry pattern for inquiring about the truth "Yes/No inquiry pattern", (2) an inquiry pattern for selecting from a group "Wh (When, Where, What, or Why) inquiry pattern", (3) a pattern including an answer, an agreement, an acceptance, etc. "answer pattern", (4) a pattern including a self-disclosure, a request, etc. "disclosure pattern", (5) a pattern including a greeting, an introduction, etc. "other patterns", and so on. Note that the above-shown speech patterns are merely an example and the speech patterns are not limited to the above-shown example.

Figure 3:
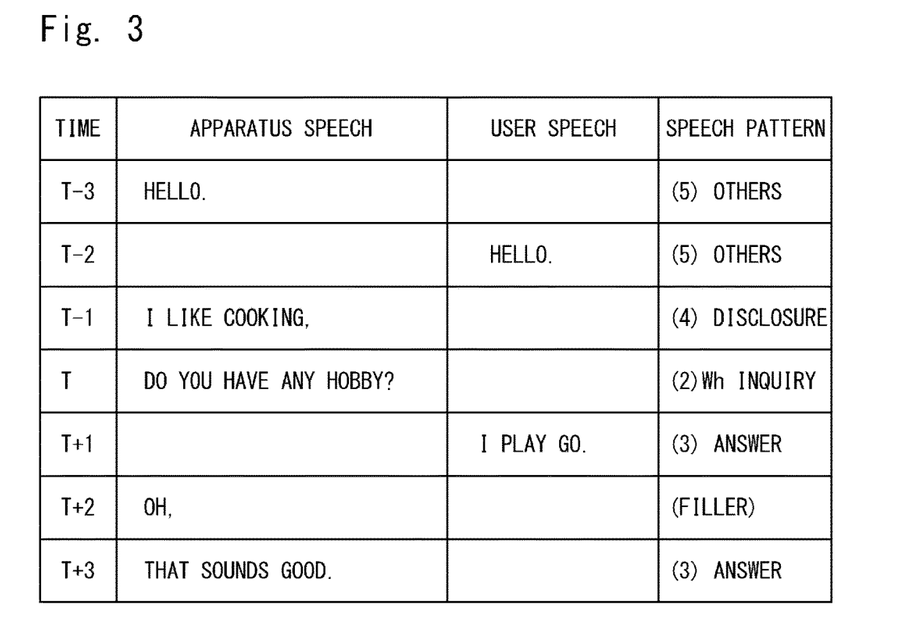
FIG. 3 shows an example of speeches generated by an apparatus and speeches uttered by a user.

FIG. 3 shows an example of apparatus speeches and user speeches. In FIG. 3, apparatus speeches and user speeches are arranged in a chronological order. Times T−3 to T−1 are times for apparatus speeches and user speeches in the past, i.e., before the current time T. Further, times T+1 to T+3 are times for apparatus speeches and user speeches after the current time T.

For example, as shown in FIG. 3, the classification unit 7 can classify user speeches and apparatus speeches from the time T−3 to T+3 based on these user speeches and these apparatus speeches based on a rule or by using a classification model. More specifically, the classification unit 7 classifies an apparatus speech "Do you have any hobby?" at the time T into the "Wh inquiry pattern" for the user. Further, the classification unit 7 classifies the subsequent user speech "I play go" at the time T+1 into the "answer pattern". After that, the classification unit 7 classifies the subsequent user speech "That sounds good" at the time T+3 into the "answer pattern" by using a state sequence estimation model (a conditional random field) or the like.

Figure 4:
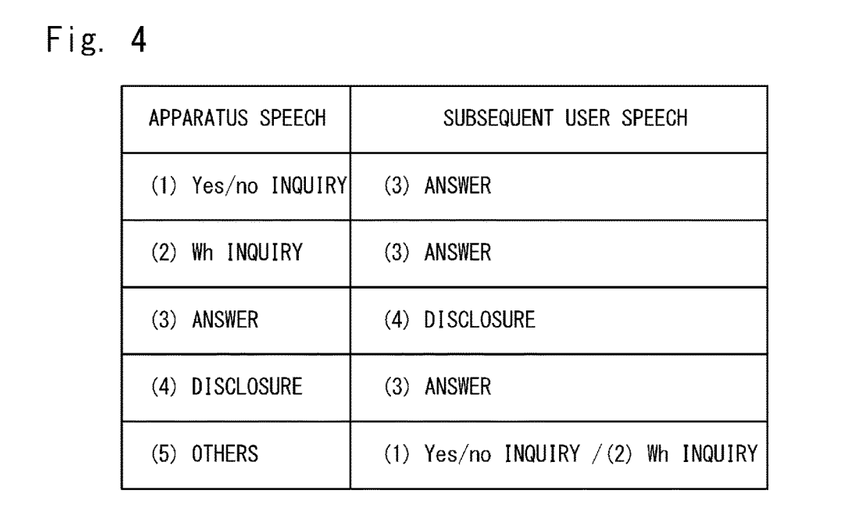
FIG. 4 shows an example of correspondences between preceding speeches generated by an apparatus and speeches uttered by a user.

The classification unit 7 may combine a preceding user speech and an apparatus speech subsequent thereto and classify the combined speech. For example, when a speech pattern is the "Yes/No inquiry pattern", a speech pattern subsequent thereto is inevitability determined to be an "answer pattern". Therefore, when a preceding user speech is the "Yes/No inquiry pattern", the classification unit 7 classifies an apparatus speech subsequent thereto into the "answer pattern". Similarly, when a preceding user speech is an "answer pattern", the classification unit 7 classifies an apparatus speech subsequent thereto into the "answer pattern". The classification unit 7 may classify a subsequent user speech according to an apparatus speech preceding that user speech based on a rule. For example, as shown in FIG.

4, when the apparatus speech at the time T is the "Yes/No inquiry pattern" or the "Wh inquiry pattern, the classification unit 7 classifies the user speech at the time T+1 into the "answer pattern" based on a rule. Similarly, when the apparatus speech at the time T is the "answer pattern", the classification unit 7 classifies the user speech at the time T+1 into the "disclosure pattern" based on a rule.

The classification unit 7 may learn a classification model in advance based on data including parts and their types, predicate terms and their types, and correct classifications, and classify the user speech at the time T+1 by using the learning result. The classification unit 7 can classify the apparatus speech at the time T+2 based on the types of the speeches from the time T−3 to T+1.

The feature-value calculation unit 8 is a specific example of the feature-value calculation means. The feature-value calculation unit 8 calculates a feature value of a preceding or subsequent speech based on information about the type of a feature value associated with the speech pattern into which the first response sentence (the apparatus speech) has been classified by the classification unit 7.

Note that the optimal forms of fillers inserted in a conversation vary according to the scene of that conversation. For example, in a conversation scene in which after a user utters a voice at a time T+1 subsequent to a first response sentence at a time T, a filler word is output at a time T+2 and a second response sentence is output at a time T+3, the optimal form of the filler inserted after the first response sentence varies according to the content (e.g., meaning) of the first response sentence. Further, how to recognize a feature(s) that is the most suitable for determining the optimal filler form also varies.

For example, in the case of a filler that is inserted after a "Yes/No inquiry pattern" for inquiring about the truth, prosodic information (such as a length of a speech) of a preceding speech significantly affects the form of that filler. Therefore, in order to perform a more natural conversation, it is especially effective to recognize the feature of the prosodic information of the preceding speech, select a filler form suitable for the recognized feature, and generate a filler word according to the selected filler form.

Therefore, the feature-value calculation unit 8 calculates a feature value of a preceding or subsequent speech based on information about the type of the feature value associated with the speech pattern into which the first embodiments has been classified by the classification unit 7. The filler generation unit 5 generates an optimal filler word according to the feature value calculated by the feature-value calculation unit 8.

In this way, it is possible to classify the first response sentence into one of the predetermined speech patterns, calculate a feature value of an optimal preceding or subsequent speech corresponding to the speech pattern into which the first response sentence has been classified (hereinafter simply referred to as "the classified speech pattern"), and generate the most suitable filler word for the conversation by using the calculated feature value.

Figure 5:
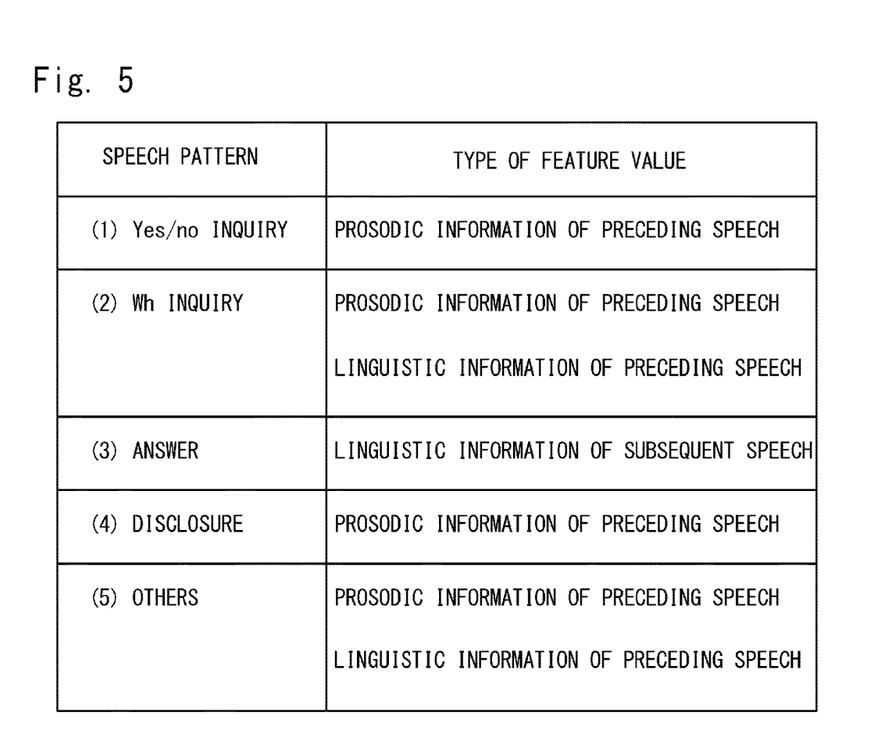
FIG. 5 shows an example of table information associating speech patterns and types of feature values.

As shown in FIG. 5, for example, information about types of feature values are associated with speech patterns. FIG. 5 shows an example of table information in which speech patterns are associated with types of feature values. The table information is set (i.e., stored) in advance in the storage unit 9 or the like. Note that the table information shown in FIG. 5 is merely an example and the table information is not limited to this example.

In FIG. 5, for example, a "Yes/No inquiry pattern" is associated with "prosodic information of preceding speech".

A "Wh inquiry pattern" is associated with "prosodic information of preceding speech" and "linguistic information of preceding speech". Further, an "answer pattern" is associated with "linguistic information of subsequent speech".

Note that the "prosodic information of preceding speech" includes, for example, F0 (fundamental frequency) in a predetermined period (about 100 msec) at the end of the vocal speech, a maximum value, a minimum value, an average value, and a first-order regression coefficient (inclination) for power, a length of a speech, a length of a pause, a speech speed, etc. in the preceding speech.

The "linguistic information of preceding speech" includes, for example, a part at the end of the speech, a clause boundary label at the end of the speech, the number of words, the number of clauses, etc. in the preceding speech. The clause boundary label is divided into three levels, i.e., an absolute boundary such as "I think", a strong boundary such as "although", and a weak boundary such as "if" according to the magnitude of a gap immediately after a clause boundary. The "linguistic information of subsequent speech" includes a part at the beginning of the speech, the number of words, the number of clauses, etc. in the subsequent speech.

The feature-value calculation unit 8 calculates a feature value (a feature vector) corresponding to the speech pattern into which the first response sentence has been classified by the classification unit 7 (hereinafter simply referred to as "the speech pattern classified by the classification unit 7") based on that speech pattern and the table information stored in the storage unit 9. The feature-value calculation unit 8 calculates feature vectors of the prosodic information of the preceding speech, the linguistic information of the preceding speech, and the linguistic information of the subsequent speech based on the user's voice information supplied from the voice recognition unit 2, the character-string information supplied from the syntactic analysis unit 3, the response sentence (text data) supplied from the response-sentence generation unit 4, and the like.

For example, the feature-value calculation unit 8 calculates a feature vector of "the linguistic information of the subsequent speech" (a part at the beginning of the speech, the number of words, the number of clauses, etc.) corresponding to the speech pattern "answer pattern" classified by the classification unit 7 based on the table information stored in the storage unit 9.

As shown in FIG. 5, information about a plurality of types of feature values may be associated with one speech pattern. For example, prosodic information of a preceding speech and linguistic information of the preceding speech may be associated with the speech pattern "Wh inquiry pattern". In such a case, the feature-value calculation unit 8 calculates a feature vector of "the prosodic information of the preceding speech" corresponding to the speech pattern "Wh inquiry pattern" classified by the classification unit 7 and a feature vector of "the linguistic information of the preceding speech" corresponding to that speech pattern based on the table information stored in the storage unit 9. Then, the feature-value calculation unit 8 calculates a unified feature vector of these feature vectors.

Note that a process that is performed based on prosodic information of a subsequent speech involves the subsequent speech and a syntactic analysis thereof Therefore, its processing load is large and the lead time is increased (about five seconds). Similarly, a process that is performed based on linguistic information of a preceding speech involves a syntactic analysis thereof Therefore, its processing load is large and the lead time is increased (about four seconds).

There is a possibility that the rhythm and the naturalness of the conversation could deteriorate due to such large processing loads. Therefore, if possible, a process that is performed based solely on prosodic information of a preceding speech is preferred. However, there are cases in which use of linguistic information is preferred in order to generate appropriate filler words.

Therefore, in this embodiment, "prosodic information" and "linguistic information" are associated with speech patterns in the table information in order to achieve both a reduction in a processing load and generation of an appropriate filler word. In this way, it is possible to achieve both a reduction in a processing load and generation of an appropriate filler word and thereby improve the rhythm and the naturalness of the conversation.

As described above, feature values of speeches can be broadly classified into linguistic features (such as a part string) in linguistic information and acoustic features (such as a pitch) in prosodic information. As described above, the use of the linguistic feature imposes a large processing load and increases the time required to output the result. Therefore, in this embodiment, the acoustic feature is mainly used, while the linguistic feature is used as required. In this way, it is possible to effectively recognize features of speeches and thereby generate appropriate filler words, while reducing the processing load.

The filler generation unit 5 generates a filler word based on a feature value calculated by the feature-value calculation unit 8. For example, the filler generation unit 5 generates a filler word by using information on predefined filler forms.

Figure 6:
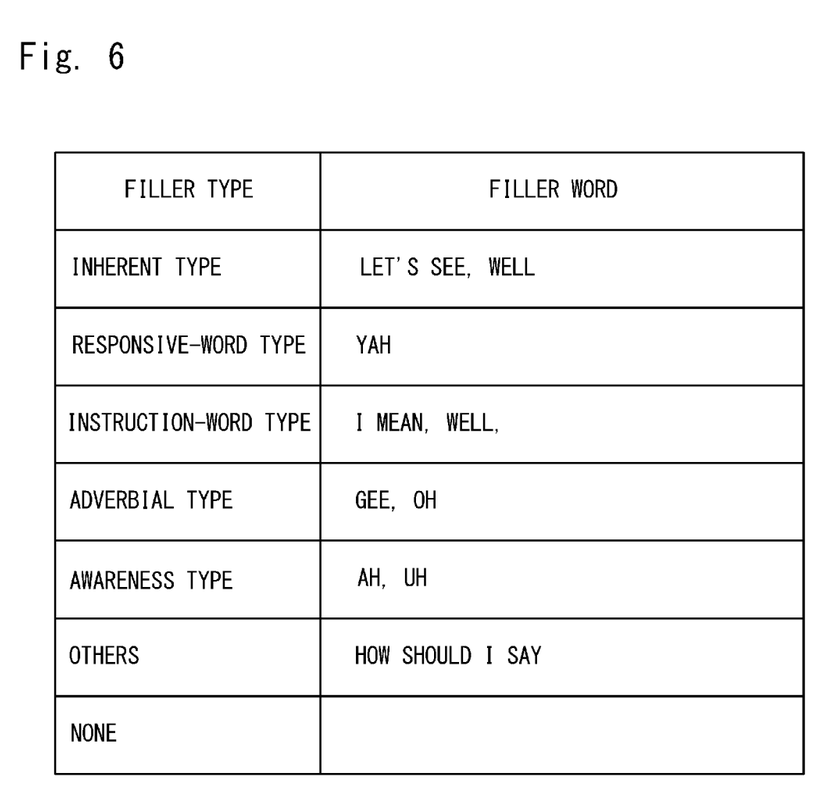
FIG. 6 shows an example of filer types.

The filler form information is, for example, set (i.e., stored) in advance in the storage unit 9 or the like. For example, as shown in FIG. 6, a feature value(s) is associated with each type of filler words (hereinafter called a filler type) in the filler form information. The filler types include an inherent type, a responsive-word type, an instruction-word type, an adverbial type, an awareness type, others, none, etc.

One or a plurality of filler words is associated with each filler type. For example, filler words "Let's see", "Well", etc. are associated with the inherent type. Feature values are preferably associated with respective filler types by using a learning machine having a structure like a combination of a decision tree such as a Random forest. Note that an arbitrary learning machine can be used. For example, a learning machine such as a logistic regression may be used.

The filler generation unit 5 selects a filler type associated with the feature value calculated by the feature-value calculation unit 8 based on that calculated feature value and the filler form information stored in the storage unit 9. Then, the filler generation unit 5 generates a filler word by selecting one filler word from the selected filler type. In this way, it is possible to select a filler form suitable for the scene of a conversation by using a feature value indicating a feature of that conversation scene and generate an optimal filler word based on the selected filler form.

For example, the filler generation unit 5 randomly selects one filler word from the selected filler type. The filler generation unit 5 may select one filler word from the selected filler type in accordance with a predetermined priority order. Alternatively, other arbitrary selecting methods may be used.

Although the filler generation unit 5 selects one filler type associated with a feature value calculated by the feature-value calculation unit 8 from seven types of filler words based on that feature value and the filler form information stored in the storage unit 9, the selecting method is not limited to this example. The filler generation unit 5 may narrow down the number of filler types based on the speech pattern classified by the classification unit 7, select one filler type associated with the feature value from among the narrowed-down filler types, and generate a filler word based on the selected filler type. By narrowing down the number of filler types in advance as described above, it is possible to reduce the processing load even further.

For example, when a speech pattern is an "answer", it is possible to narrow down possible filler types suitable for the speech pattern to four filler types (i.e., an inherent type, an adverbial type, others, and none) in advance as a matter of course. Therefore, the filler generation unit 5 narrows down the seven filler types to the four filler types (i.e., an inherent type, an adverbial type, others, and none) based on the speech pattern "answer" classified by the classification unit 7, selects one filler type associated with the feature value from among the narrowed-down filler types, and generates a filler word based on the selected filler type. For example, information associating narrowed-down filler types with speech patterns is set (i.e., stored) in the storage unit 9 or the like. The filler generation unit 5 may perform the above-described narrowing-down of filler types based on this information stored in the storage unit 9.

When the filler generation unit 5 selects one filler type "none" based on the feature value calculated by the feature-value calculation unit 8 and the filler form information stored in the storage unit 9, the filler generation unit 5 generates no filler word. In this case, no filler word is output. This means that outputting no filler word is suitable for the scene of the conversation.

The filler generation unit 5 outputs the filler word generated as described above to the voice output unit 6. For example, the voice output unit 6 outputs the filler word that is generated at the time T+2 by the filler generation unit 5 and outputs the response sentence that is generated at the time T+3 by the response-sentence generation unit 4.

Figure 7:
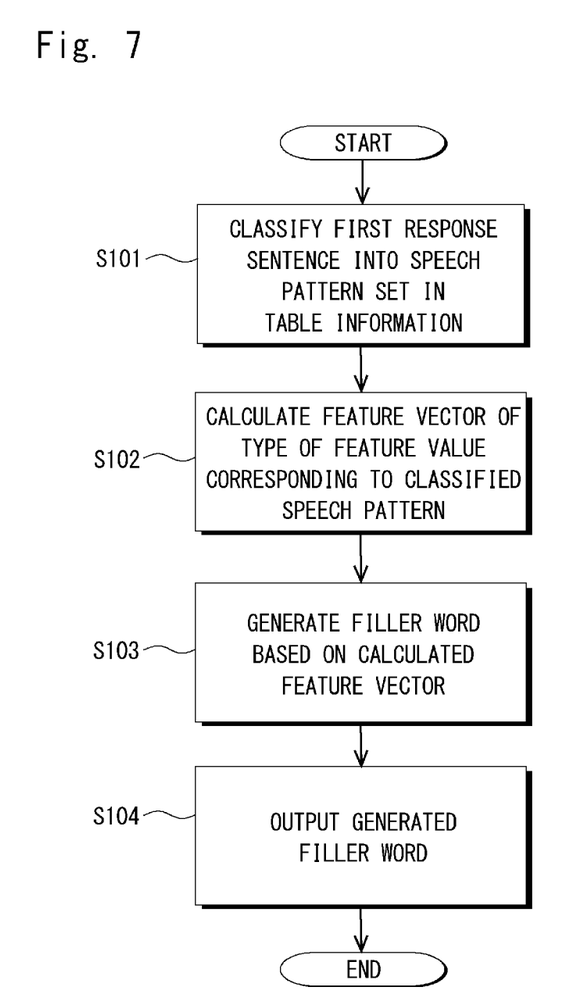
FIG. 7 is a flowchart showing a flow of a processing method performed by a voice interaction apparatus according to an embodiment of the present disclosure.

FIG. 7 is a flowchart showing a flow of a processing method performed by the voice interaction apparatus according to this embodiment.

The classification unit 7 classifies a first response sentence generated by the response-sentence generation unit 4 into one of speech patterns defined in the table information stored in the storage unit 9 based on that table information (step S101).

The feature-value calculation unit 8 calculates a feature vector of a type of a feature value corresponding to the speech pattern classified by the classification unit 7 based on that speech pattern and the table information stored in the storage unit 9 (step S102).

The filler generation unit 5 selects one filler type from among a plurality of filler types defined in filler form information stored in the storage unit 9 based on the feature vector calculated by the feature-value calculation unit 8 and the filler form information. Then, the filler generation unit 5 generates a filler word by selecting one filler word from the selected filler type (step S103).

The voice output unit 6 outputs the filler word generated by the filler generation unit 5 (step S104).

As described above, the voice interaction apparatus 1 according to this embodiment includes the classification unit 7 that classifies a response sentence generated by the response-sentence generation unit 4 into one of predetermined speech patterns indicating predefined speech types. The voice output unit 6 outputs, after a user utters a voice subsequent to a first response sentence, a filler word and outputs a second response sentence. In this case, the classification unit 7 classifies the first response sentence into one of the speech patterns. The filler generation unit 5 generates a filler word based on the speech pattern classified by the classification unit 7.

By generating a filler word according to the speech pattern corresponding to the first response sentence, it is possible to generate an optimal filler word suitable for a content (e.g., a meaning) of user's voice subsequent to the first response sentence. By outputting this optimal filler word, it is possible to perform a more natural conversation.

Note that the present disclosure is not limited to the above-described embodiments, and various modifications can be made without departing from the spirit and scope of the present disclosure.

Although the voice output unit 6 that outputs a voice is used as the output means in the above-described embodiments, the output means is not limited to this example. For example, a display unit that outputs (i.e., displays) text may be used as the output means.

In the present disclosure, for example, the processes shown in FIG. 7 can be implemented by causing a CPU to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A voice interaction apparatus comprising:
   circuitry configured to:
   recognize a voice of a user;
   generate a first response sentence to the voice of the user based on the voice recognized voice;
   generate a filler word to be inserted in a conversation with the user;
   output the first response sentence and the filler word;
   classify the first response sentence into one of predetermined speech patterns indicating predefined speech types; and
   when outputting, after the user utters a voice subsequent to the outputting of the first response sentence, the filler word and outputting a second response sentence:
      classify the first response sentence into one of the predetermined speech patterns, and
      generate the filler word based on the predetermined speech pattern into which the first response sentence has been classified.

2. The voice interaction apparatus according to claim 1, wherein the circuitry is configured to:
   store table information including the predetermined speech patterns and information about types of feature values associated with the predetermined speech patterns;
   calculate a feature value of a preceding or subsequent speech based on information about a type of a feature value associated with the predetermined speech pattern into which the first response sentence has been classified; and
   generate the filler word based on the calculated feature value.

3. The voice interaction apparatus according to claim 2, wherein the information about the type of the feature value includes at least one of prosodic information of the preceding speech, linguistic information of the preceding speech, linguistic information of the subsequent speech, and prosodic information of the subsequent speech.

4. The voice interaction apparatus according to claim 2, wherein the circuitry is configured to:
   store filler form information associated with respective feature values of filler types each of which includes at least one filler word and indicates a type of the at least one filler word; and
   narrow down a number of filler types based on the speech predetermined pattern into which the first response sentence has been classified;
   select one filler type associated with the calculated feature value from among the narrowed-down number of filler types; and
   generate the filler word by selecting the filler word included in the selected filler type.

5. A processing method for voice interaction, comprising:
   recognizing a voice of a user;
   generating a first response sentence to the voice of the user based on the recognized voice;
   generating a filler word to be inserted in a conversation with the user;
   outputting the first response sentence and the filler word; and
   when outputting, after the user utters a voice subsequent to the outputting of the first response sentence, the filler word and outputting a second response sentence:
      classifying the first response sentence into one of predetermined speech patterns indicating predefined speech types, and
      generating the filler word based on the predetermined speech pattern into which the first response sentence has been classified.

6. A non-transitory computer readable medium that stores a program for voice interaction which when executed causes a computer to preform a method comprising:
   recognizing a voice of a user;
   generating a first response sentence to the voice of the user based on the recognized voice;
   generating a filler word to be inserted in a conversation with the user;
   outputting the first response sentence and the filler word,
   when outputting, after the user utters a voice subsequent to the outputting of the first response sentence, the filler word and outputting a second response sentence:
      classifying the first response sentence into one of predetermined speech patterns indicating predefined speech types, and generating the filler word based on the predetermined speech pattern into which the first response sentence has been classified.

* * * * *